APPLIANCE LATCH

Original Filed March 10, 1967 4 Sheets-Sheet 1

INVENTOR
Karl H. Erickson
by Wolfe, Hubbard, Leit & Osann
ATTORNEYS

APPLIANCE LATCH

Original Filed March 10, 1967 4 Sheets-Sheet 2

INVENTOR
Karl H. Erickson
by Wolfe, Hubbard, Vait & Crann
ATTORNEYS

APPLIANCE LATCH

Original Filed March 10, 1967 4 Sheets-Sheet 3

INVENTOR
Karl H. Erickson
by Wolfe, Hubbard, Leit & Gunn
ATTORNEY

APPLIANCE LATCH

Original Filed March 10, 1967 4 Sheets-Sheet 4

INVENTOR
Karl H. Erickson
by Wolfe, Hubbard, Vait & Gunn
ATTORNEYS

United States Patent Office

Re. 27,276
Reissued Jan. 18, 1972

27,276
APPLIANCE LATCH

Karl H. Erickson, Rockford, Ill., assignor to Amerock Corporation, Rockford, Ill.

Original No. 3,476,424, dated Nov. 4, 1969, Ser. No. 622,142, Mar. 10, 1967. Application for reissue Mar. 13, 1970, Ser. No. 19,518
Int. Cl. E05c *5/03, 19/10*
U.S. Cl. 292—113 8 Claims

Matter enclosed in heavy brackets [ ] appears in the original patent but forms no part of this reissue specification; matter printed in italics indicates the additions made by reissue.

ABSTRACT OF THE DISCLOSURE

A latch for a self-cleaning oven and comprising a lever operable to move a bolt first along an angular path into engagement with a strike on the oven door and then inwardly along a straight path to a latched position to draw the door in tightly against the oven cabinet. The motion of the lever is transmitted to the bolt by a pivoted driving link which, with the aid of a spring, prevents the bolt from moving inwardly to its latched position unless the door is closed and the bolt actually engages the strike when the bolt is moved along the angular path.

BACKGROUND OF THE INVENTION

This invention relates to a latch especially suitable for use in latching the door of an appliance such as a self-cleaning oven or an automatic dishwasher in a tightly closed condition prior to operation of the appliance and includes generally an operating lever for moving a latching bolt first along the front of the appliance cabinet from an unlatched position to an extended position to engage a strike on the door, and then inwardly toward the cabinet to a latched position to draw the door tightly closed against the cabinet. More particularly, the invention constitutes an improvement over the latch disclosed in the copending application of Roland V. Fowler, Ser. No. 592,137, filed Nov. 4, 1966, in which the draw-in motion of the bolt is blocked unless the bolt engages the strike and in which engagement of the bolt with the strike initiates the draw-in motion thereby to insure that the bolt cannot be moved inwardly to its latched position when the door is open.

SUMMARY OF THE INVENTION

The present invention contemplates a new and improved driving connection between the operating lever and the bolt of a latch of the foregoing character to simplify the draw-in motion of the bolt in shifting to the latched position and, at the same time, to reduce wear and promote longer-lasting lubrication between the parts of the latch.

DETAILED DESCRIPTION

Figure 6:
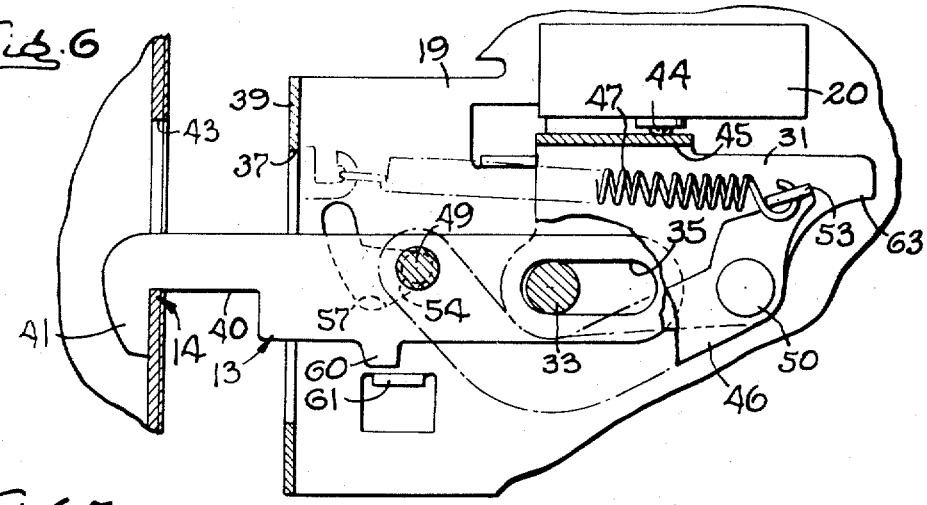
FIGS. 6, 7 and 8 are views similar to FIGS. 2, 3 and 4, respectively, with parts being broken away for purposes of clarity.
Figure 7:
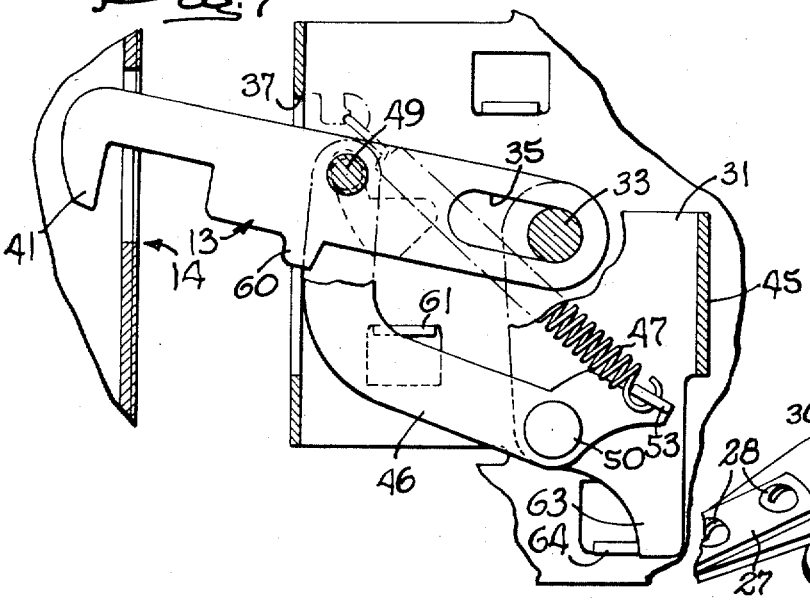

As shown in the drawings for purposes of illustration, the invention is embodied in a latch mounted within the cabinet 11 of an appliance such as a self-cleaning oven and including an elongated bolt 13 selectively engageable with a strike 14 on the oven door 16 to latch the door in a tightly closed position prior to operation of a high-temperature cleaning unit (not shown) for burning off food and grease from the oven walls. In such a latch, an operating lever 17 is pivoted on a latch base or mounting bracket 19 and is connected to the bolt in such a manner that counterclockwise swinging of the lever from an unlatching position to an intermediate position and then to a tight-sealing position results in a two-step movement of the bolt to latch the door. As the lever is swung between its successive positions, the bolt first moves along the front of the cabinet from an unlatched position (FIGS. 3 and 7) to an extended position (FIG. 5) in which an outer end of the bolt is disposed in engagement with the strike, and then moves inwardly toward the cabinet to a latched position (FIGS. 2 and 6) to draw the door into tight-sealing relation with the cabinet. To prevent activation of the high-temperature cleaning unit when the door is open or free to open, a safety switch 20( FIG. 2) in the control circuit of the unit is arranged to be closed to condition the circuit for operation only when the lever is in its tight-sealing position and when the door is closed and tightly sealed.

Figure 9:
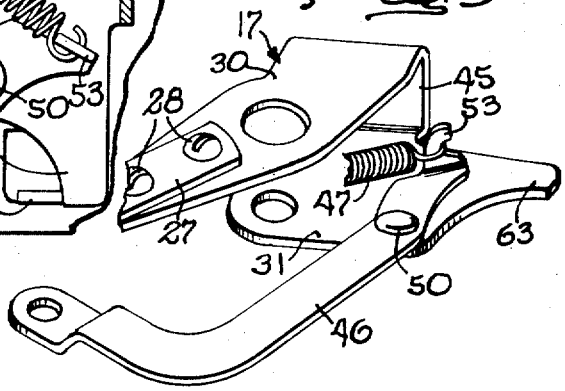
FIG. 9 is a fragmentary perspective view of the operating lever and the driving connection.

In this instance, the latch base 19 is a generally rectangular sheet metal stamping disposed in a horizontal position between an insulated top wall 21 (FIG. 1) of the oven chamber and the upper wall 23 of the cabinet 11. The base is fastened to the top wall 21 by screws 24 extending vertically through a pair of laterally spaced mounting wings 25 formed near the outer side of the base and a continuous mounting wing 26 extending along the inner side of the base. The operating lever 17 comprises an elongated handle 27 fastened at its inner end by screws 28 to the upper leg 30 (FIG. 9) of a U-shaped plate formed with a lower leg 31 which is pivotally connected to the base by an upright pin or rivet 33. The handle projects outwardly through an elongated slot 34 (FIG. 1) located between the top of the door 16 and the lower side of the cabinet wall 23 and may be provided with a knob (not shown) to facilitate gripping of the handle during swinging of the lever about the axis of the rivet.

The bolt 13 also is a sheet metal stamping disposed between the lower lever leg 31 and the mounting base 19 and formed with a longitudinal slot 35 (FIG. 6) which loosely receives the rivet 33. A pair of washers 36 (FIG. 1) on the shank of the rivet holds the upper and lower surfaces of the bolt vertically spaced from the lower lever leg and the mounting base, respectively. The outer end portion of the bolt projects outwardly through a slot 37 (FIG. 6) formed in a flange 39 upturned along the outer edge of the base. One side of the outer end portion is notched to form an offset side edge 40 and a hook end 41.

During normal cooking operations when the self-cleaning unit and the latch are not in use, the lever 17 is disposed in the unlatching position (FIGS. 3 and 7), the bolt 13 is disposed in the unlatched position, and the hook 41 projects outwardly through a slot 43 formed in the inner liner of the door 16. In this position of the bolt, the side edge 40 is spaced laterally from the strike 14 which may be the right edge of the slot 43 (as viewed from the front of the cabinet) or, as shown herein, the right edge of a slot alined with the slot 43 and formed through a flat plate fastened to the inner liner of the door. To latch the door and activate the self-cleaning unit, the lever first is swung counterclockwise about the rivet 33 to the intermediate position (FIG. 5) to move the bolt to its extended position with the side edge 40 in engagement with the strike. The lever then is swung to the tight-sealing position (FIGS. 2 and 6) to draw the bolt inwardly to its latched position, the hook 41 engaging the strike and drawing the door tightly against the cabinet 11 as an incident to the inward or draw-in motion of the bolt.

Figure 2:
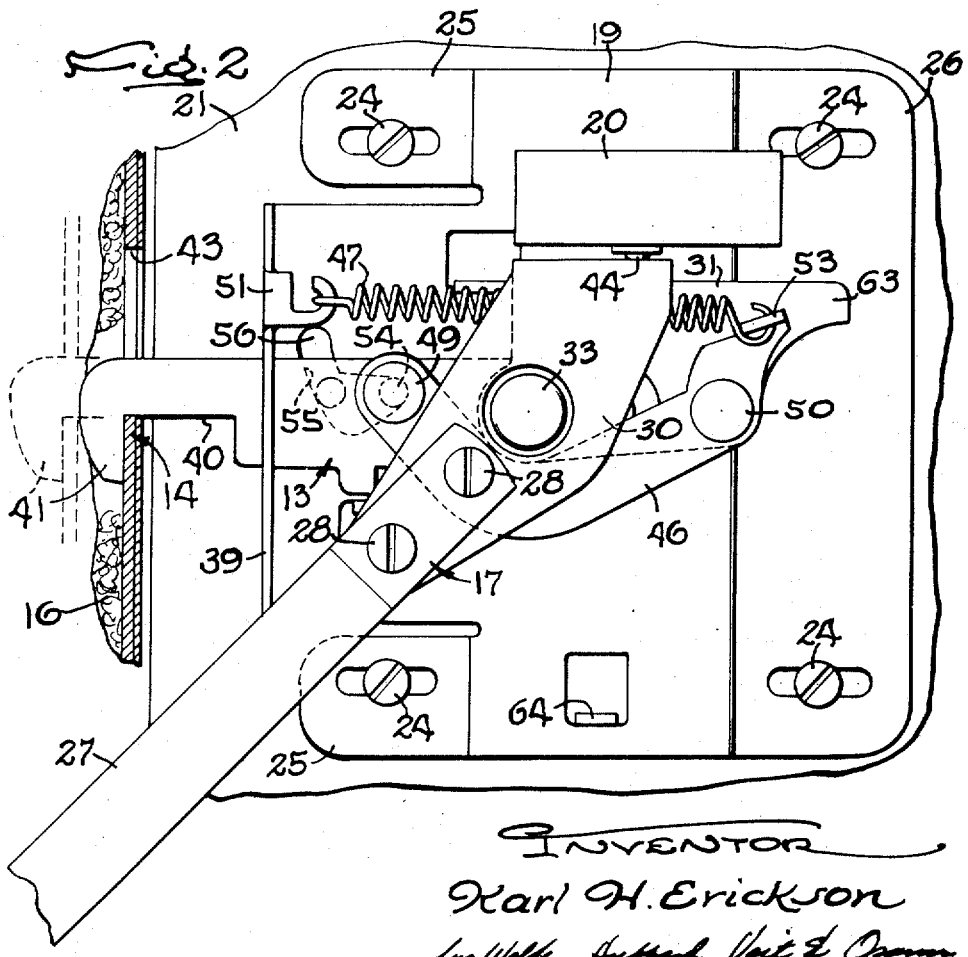
FIG. 2 is a fragmentary cross-section taken substantially along the line 2—2 of FIG. 1 and showing the parts with the appliance door tightly closed and with the bolt in its latched position.
Figure 4:
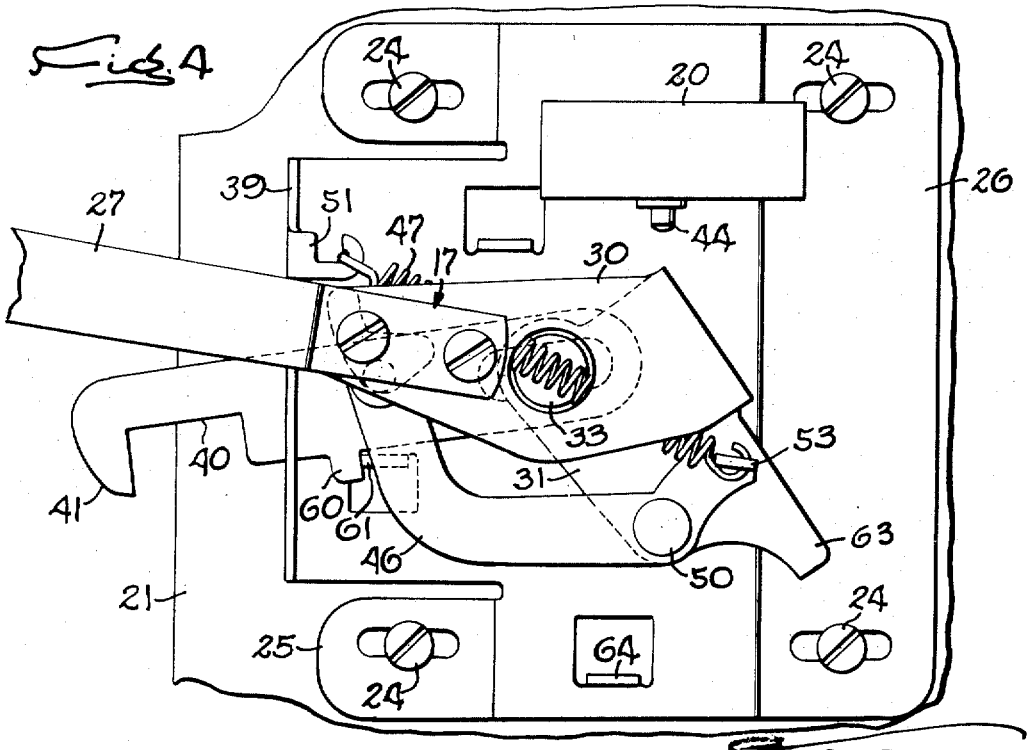
FIG. 4 is a view similar to FIG. 2 and showing the parts with the door open and with the bolt in a blocked position.

As shown in FIGS. 2 and 4, the safety switch 20 for the cleaning unit is mounted on the base 19 and includes an operator button 44 which is depressed to activate the cleaning unit as the lever 17 is moved to its tight-sealing position. In this instance, the button is depressed by an upright wall 45 (FIGS. 6 and 9) formed integrally with and extending between the upper and lower legs 30 and 31 of the lever. The upright wall is spaced from the operating button when the lever is in its unlatching and intermediate positions, and then is moved into engagement with the button as the lever is moved to its tight-sealing position.

Since activation of the high-temperature cleaning unit with the door 16 in an open position would allow smoke and odors to escape from the cabinet 11 or might cause a sudden flame, the lever 17 is prevented from moving to its tight-sealing position and against the switch button 44 when the door is not closed. As in the latch disclosed in the above-mentioned application, the bolt 13 and the lever are blocked (see FIGS. 4 and 8) against movement to their latched and tight-sealing positions, respectively, when they are moved to their extended and intermediate positions without the bolt engaging the strike 14. Engagement of the bolt with the strike, however, causes the bolt to draw inwardly toward its latched position and, at the same time, frees the lever for movement to its tight-sealing position to depress the switch button. Accordingly, the latch is strike-responsive since the bolt cannot be moved inwardly until it actually engages the strike and since engagement of the bolt with the strike initiates the draw-in motion.

In accordance with the present invention, the motion of the operating lever 17 of a strike-responsive latch of the foregoing character is transmitted to the bolt 13 by an improved pivotal driving connection 46 which is subject to less wear and which remains better lubricated under the high-temperature conditions existing in the oven than the comparable parts of prior latches of the same general type. Moreover, the draw-in motion undertaken by the bolt in shifting from the extended position to the latched position is considerably simpler than the motion formerly required in strike-responsive latches.

Generally stated, the driving connections 46 is an L-shaped link pivotally connected between the bolt 13 and the lever 17 and resiliently urged in a counterclockwise direction by a spring 47 so as to hold the bolt for movement in an angular path substantially about the axis of the rivet 33 from the unlatched position (FIG. 3) to the extended position (FIG. 5) as the lever is swung from the unlatching position to the intermediate position. When the door 16 is closed, engagement of the bolt with the strike 14 stops further angular movement of the bolt and, upon continued swinging of the lever toward the tight-sealing position (FIG. 2), the link 46 shifts the bolt inwardly against the action of the spring and with a simple sliding motion along a substantially straight or linear path to the latched position. If the door is open and the bolt moves to the extended position without engaging the strike, the spring-urged link restricts the bolt to movement along the angular path and prevents the bolt from sliding inwardly to the latched position. As a result, further swinging of the lever toward the tight-sealing position moves the bolt a short distance along the angular path beyond the extended position and to the position shown in FIGS. 4 and 8 in which all motion of both the lever and the bolt is blocked and in which the lever is spaced away from the switch button 44 so that the self-cleaning unit cannot be activated.

More specifically, the driving link 46 is located between the upper and lower legs 30 and 31 of the lever 17 and is pivotally connected near its outer end to the upper side of the bolt 13 by a vertically disposed rivet 49 fastened approximately mid-way between the ends of the bolt. Near its inner end, the lever is pivotally connected to the lower leg 31 of the lever by a second and parallel rivet 50 fastened to the leg. The motion of the lever is transmitted to the bolt through the link and the two connecting rivets 49 and 50 and, since the link merely pivots on the rivets, very little wear occurs at the driving points during the service life of the latch. Moreover, lubricating grease placed between the rivets and the link before installation of the latch remains effective to promote free movement of the parts in spite of the high temperature conditions occurring in the oven.

In this instance, the spring 47 is of the coiled extension type and is stretched between a hook 51 (FIG. 2) projecting inwardly from the base flange 39 and a hook 53 formed integrally with and upstanding from the inner end of the link 46. The spring acts directly on the link to urge the latter counterclockwise about the rivet 50 and acts through the link and the rivet 49 to urge the bolt 13 outwardly. The extent to which the bolt may move outwardly under the urging of the spring may be limited by engagement of the inner end of the slot 35 in the bolt with the rivet 33 or, prefeoably and as shown herein, such outward movement is limited by engagement of a follower 54 (FIGS. 1 and 8) with a cam surface 55 (FIGS. 2 and 8) on the base 19.

Figure 1:
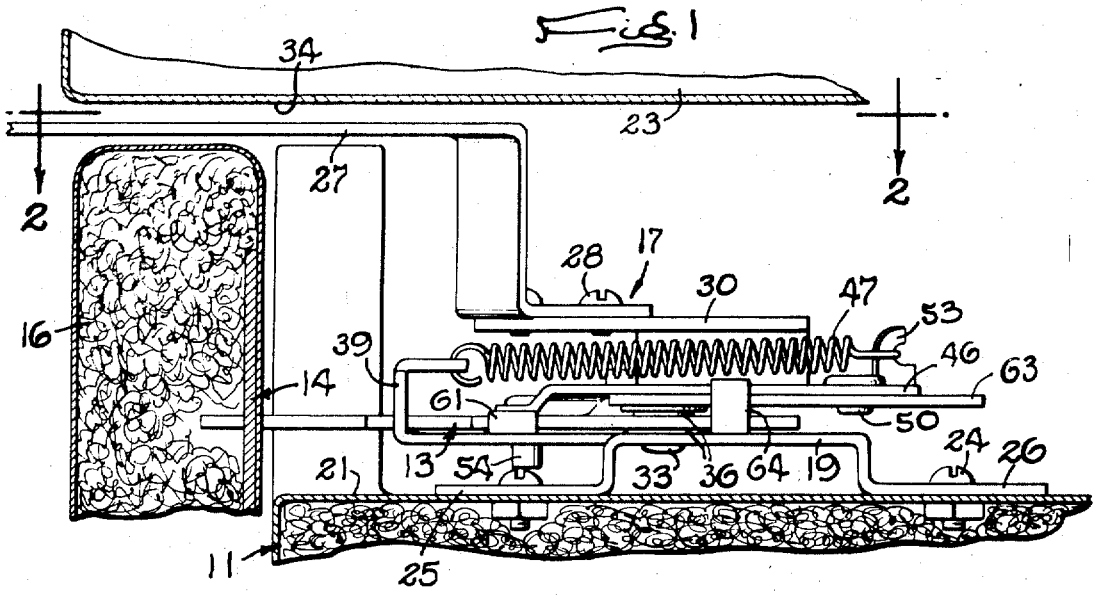
FIGURE 1 is a fragmentary vertical cross-section of an appliance equipped with a latch embodying the novel features of the present invention.
Figure 8:
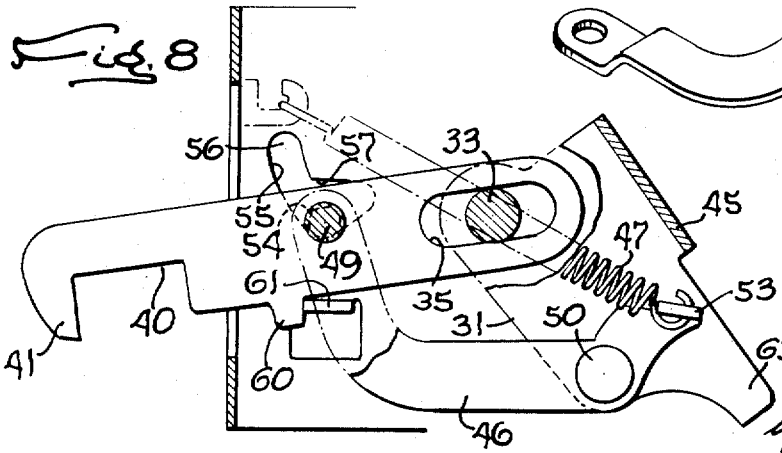

As shown in FIGS. 1, 2 and 8, the cam surface 55 is an outer edge if a curved slot 56 formed through the outer portion of the base 19. The follower 54 is formed by a depending pin-like extension formed integrally with the lower end of the rivet 49 used for connecting the link 46 to the bolt 13. The follower 54 projects downwardly into the slot 56 from the underside of the bolt and is urged outwardly against the outer cam edge 55 due to the action of the spring 47 urging the link 46 counterclockwise about the rivet 50. In addition to limiting the outward movement of the bolt, the cam edge 55 guides the bolt from the unlatched position (FIG. 3) to the extended position and determines the shape of the angular path. To accommodate inward movement of the follower 54 as the bolt slides inwardly to its latched position, the slot 56 is formed with a relatively wide inwardly extending portion 57 (see FIGS. 6 and 8) into which the follower moves when the bolt is drawn in toward the cabinet.

Figure 3:
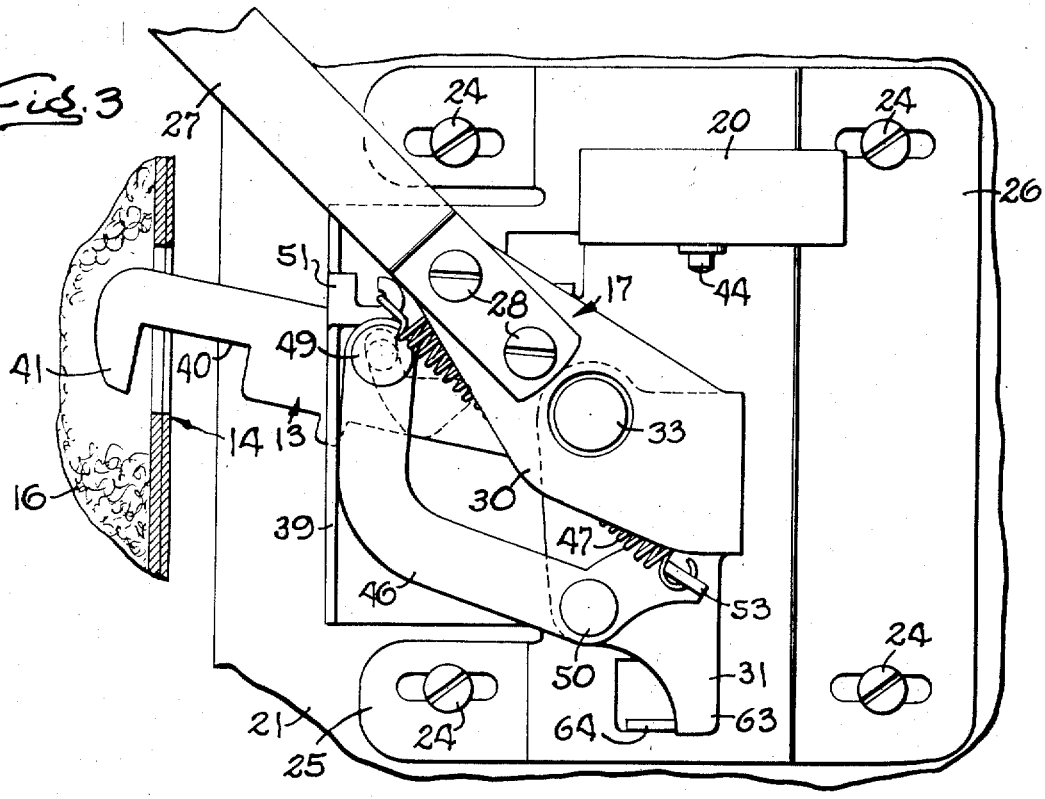
FIG. 3 is a view similar to FIG. 2 and showing the parts with the bolt in its unlatched position.
Figure 5:
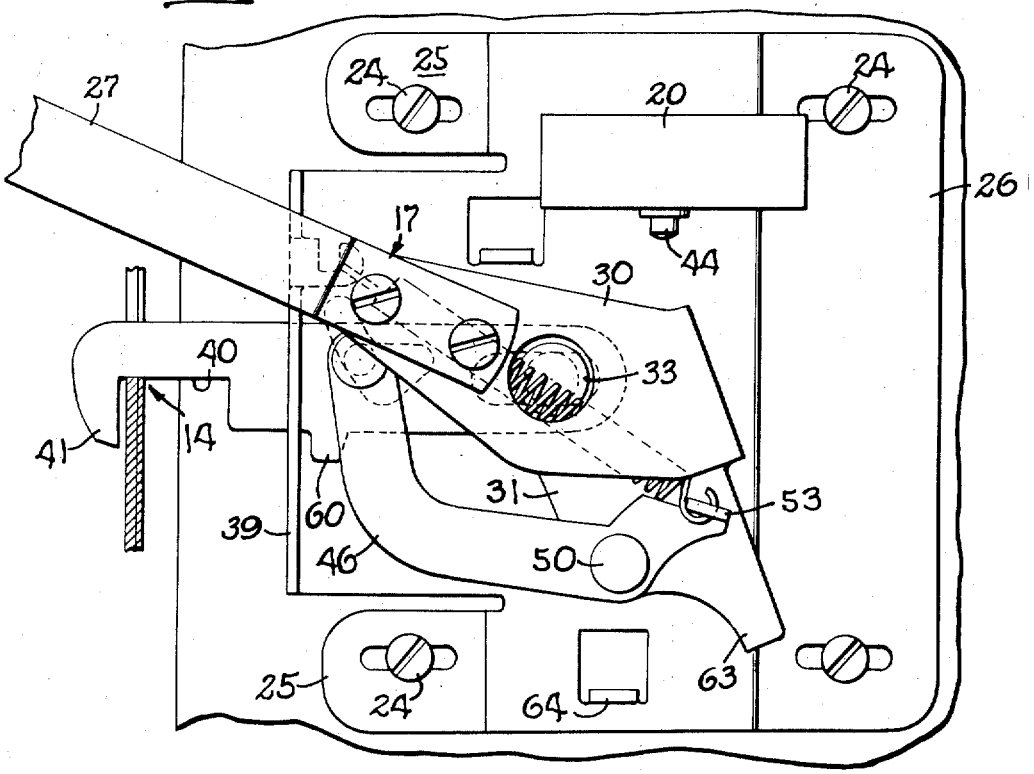
FIG. 5 is a view similar to FIG. 2 and showing the parts with the door closed and with the bolts in its extended position.

When the bolt 13 is in its unlatched position and the lever 17 is in its unlatching position shown in FIG. 3, the spring 47 urges the link 46 counterclockwise about the rivet 50 and acts through the link and the rivet 49 to urge the bolt outwardly. As a result, the follower 54 is pressed outwardly against the cam edge 55, and the inner end of the elongated slot 35 in the bolt is pressed outwardly against the rivet 33. As the lever is swung counterclockwise toward its intermediate position, its motion is transmitted through the link and to the bolt thereby causing the bolt to move toward its extended position (FIG. 5). During this movement, the follower 54 travels along the cam edge 55 and guides the bolt in an angular path substantially about the axis of the rivet 33, although in the latch shown the path is not truly arcuate about the rivet 33 since the cam edge is shaped to move the bolt inwardly a very short distance relative to the rivet 33 as the bolt moves to the extended position.

Upon moving to the extended position with the door 16 closed as shown in FIG. 5, the bolt 13 engages the strike 14 and the latter prevents further angular movement of the bolt. The force resulting from continued swing of the lever 17 toward the tight-sealing position then overcomes the force exerted by the spring 47 and is directed to the bolt through the link 46 to slide the bolt inwardly in a straight path to its latched position, the follower 54 being pulled away from the cam edge 55 and moving into the inwardly extending portion 57 of the slot 56 as an incident to the inward movement of the bolt.

If the door 16 is open so that the bolt 13 fails to engage the strike 14 upon being moved along the angular path from the unlatched position (FIG. 3) to the extended position (FIG. 5), the force of the spring 47 acting through the link 46 keeps the follower 54 pressed against the cam edge 55 and no force is present to overcome the spring force and to change the direction of movement of the bolt. Accordingly, as the lever 17 is swung from its intermediate position (FIG. 5) toward its tight-sealing position, the bolt simply continues along the angular path defined by the cam edge and moves a short distance beyond the extended position (FIG. 5) to the position shown in FIGS. 4 and 8. Upon reaching the latter position, a lug 60 on the bolt engages a tab 61 projecting upwardly from the base and all further movement of the bolt and the lever thereby is blocked so that the lever cannot be moved all the way to the tight-sealing position to actuate the switch button 44.

In addition to exerting a force on the bolt 13 preventing the latter from sliding inwardly to its latched position when the door 16 is open, the spring 47 automatically returns the lever 17 and the bolt back from the blocked positions shown in FIG. 4 as soon as the handle 27 is manually released by the person operating the latch. When the lever and the bolt are in their blocked positions, the spring acts through the link and the rivet 50 to urge the lever clockwise about the rivet 33. Thus, as the handle is released, the spring swings the lever clockwise back to its unlatching position (FIG. 3). An integral extension 63 on the lower lever leg 31 moves against a tab 64 upstanding from the base 19 to limit the return movement of the lever. The clockwise movement of the lever is, of course, transmitted to the bolt through the link 46, and thus the bolt also is returned automatically to its unlatched position.

When the door 16 is closed and the bolt 13 engages the strike 14, swinging of the lever 17 fully into its tight-sealing position (FIG. 2) causes the rivet 50 to cross over a straight line extending between the hook 51 and the axis of the rivet 33. As a result, the effective direction of the spring force is reversed so that the spring 47 urges the lever counterclockwise about the rivet 33 to hold the lever securely in the tight-sealing position. It thus is apparent that the link 46 not only properly directs the spring force to hold the bolt for movement in the angular path, but also locates the spring force relative to the lever in such a manner that the lever will be returned to the unlatching position if the door is open and will be held in the tight-sealing position when the door is closed.

I claim as my invention:

1. In combination with an appliance cabinet having an access opening, a door for closing the opening, and a strike on the door for use in latching the door in a closed position against the cabinet, the improvement comprising, a latch having a base mounted within the cabinet, an operating lever pivoted on said base for swinging about a predetermined axis between angularly spaced unlatching, intermediate and tight-sealing positions, an elongated bolt, a driving link pivoted near one end on said bolt and pivoted near its other end on said lever to transmit movement of said lever to said bolt as said lever is swung between said positions, a follower on said bolt and spaced from said axis, a cam surface on said base engaging said follower and guiding said bolt for swinging in an angular path from an unlatched position to an extended position to engage the strike as said lever is swung from said unlatching position to said intermediate position, means mounting said bolt for endwise sliding along a straight path intersecting said axis from said extended position to a latched position as said bolt engages the strike and as said lever is swung to said tight-sealing position, said follower moving with said bolt and shifting away from said cam surface as said bolt slides to said latched position, a spring acting through said link and exerting a predetermined force on said bolt for holding said follower against said cam surface when said lever is swung from said unlatching position to said intermediate position and toward said tight-sealing position without said bolt engaging the strike thereby to hold said bolt for swinging in said angular path and to restrict sliding of the bolt along said straight path to said latched position, said spring force being overcome upon engagement of said bolt with the strike thereby to permit sliding of the bolt to said latched position as said lever is swung to said tight-sealing position.

2. The combination as defined in claim 1 in which said cam surface is the edge of a slot cut through said base, and said follower is a pin carried by said bolt and projecting into said slot.

3. The combination as defined in claim 2 in which said slot includes a portion extending inwardly from said cam surface toward said axis, said follower pin moving within said inwardly extending portion as said bolt slides from said extended position to said latched position.

4. The combination as defined in claim 2 in which said follower pin pivotally mounts said one end of said driving link on said bolt.

5. The combination defined in claim 1 in which a pivot member connects said link to said lever, said spring being connected to said link and acting on said lever through said pivot member to urge the lever in one direction about said axis when the lever is in said intermediate position and to urge the lever in the opposite direction about said axis when the lever is in said tight-sealing position.

6. The combination defined in claim 1 in which said mounting means comprise a longitudinal slot formed through said bolt, and an upright pin rigid with said base and projecting loosely into said slot, said upright pin also mounting said lever for swinging between its positions.

7. In combination with an appliance cabinet having an access opening, a door for closing the opening, and a strike on *one of* the door *and the cabinet* for use in latching the door in a closed position against the cabinet, the improvement comprising, a latch having a base mounted [within] *on the other of the door and* the cabinet, an operating lever pivoted on said base for swinging between angularly spaced unlatching, intermediate and tight-sealing positions, an elongated bolt having a longitudinal slot intermediate its ends, a pin projecting through said slot and mounting said lever on said base for swinging between said positions, a driving link pivotally connected near one end to said bolt and pivotally connected near its other end to said lever to transmit movement of said lever to said bolt as said lever is swung between said positions, said link first swinging said bolt substantially about the axis of said pin and in an angular path from an unlatched position to an extended position to engage the strike as said lever is swung from said unlatching position to said intermediate position, said link then sliding said bolt [endwise along] *relative to* said pin from said extended position to a latched position *on said base* directly in response to engagement of the bolt with the strike and as said lever is moved from said intermediate position to said tight-sealing position, and a spring on said base [urging] *acting on* said bolt and said one end of said link [away from said pin] with a predetermined force [thereby] to hold said bolt for swinging along said angular path and to restrict [endwise] sliding of the bolt *relative to the pin* until the bolt engages the strike, the spring force being overcome directly in response to engagement of the bolt with the strike thereby to permit sliding of the bolt *relative to the pin and* to said latch position.

8. In combination with an appliance cabinet having an access opening, a door for closing the opening, and a strike on *one of* the door *and the cabinet* for use in latching the door in a closed position against the cabinet, the improvement comprising, a latch having a base mounted [within] *on the other of the door and* the cabinet, an operating lever pivoted on said base for swinging about a predetermined axis between angularly spaced unlatching, intermediate and tight-sealing positions, an elongated bolt connected to said lever, means guiding said bolt first for swinging in an angular path substantially about said axis from an unlatched position to an extended position to engage the strike as said lever is swung from said unlatching position to said intermediate position, and then for [endwise] sliding relative to said lever in a linear path intersecting said axis from said extended positon to a latched position *on said base* to draw the inwardly toward the cabinet directly in response to engagement of the bolt with the strike and as an incident to swinging of said lever from said intermediate position to said tight-sealing position, and spring means exerting a predetermined force on said bolt [urging the latter away from said axis thereby] to hold the bolt for swinging in said angular path and to restrict sliding of the bolt *relative to the lever and* along said linear path until the bolt engages the strike, the spring force being overcome directly in response to the force created by engagement of the bolt with the strike thereby to permit sliding of the bolt *relative to the lever and* along said linear path to said latched position.

References Cited

The following references, cited by the Examiner, are of record in the patented file of this patent or the original patent.

UNITED STATES PATENTS

| | | | |
|---|---|---|---|
| 2,701,157 | 2/1955 | Lebon | 292—113 |
| 2,961,262 | 11/1960 | Nockels | 292—113 |
| 3,189,375 | 6/1965 | Getman | 292—113 |
| 3,325,200 | 6/1967 | Fowler | 292—113 |
| 3,409,320 | 11/1968 | Eckerle | 292—113 |
| 3,410,591 | 11/1968 | Fowler | 292—113 |

MARVIN A. CHAMPION, Primary Examiner

R. L. WOLFE, Assistant Examiner

U.S. Cl. X.R.

292—66